United States Patent [19]
Wikoff

[11] 3,886,658
[45] June 3, 1975

[54] HAND-HELD POWER SAW

[75] Inventor: Mark W. Wikoff, Mason, Ohio

[73] Assignee: The Wolf Machine Company, Cincinnati, Ohio

[22] Filed: May 13, 1974

[21] Appl. No.: 469,123

[52] U.S. Cl............... 30/388; 200/157; 317/135 R; 17/23; 30/296 R
[51] Int. Cl........................................... B23d 45/16
[58] Field of Search................. 310/68 A; 200/157; 317/135 R; 30/276, 388, 296 R, 166, 347; 17/23

[56] References Cited
UNITED STATES PATENTS

| | | | |
|---|---|---|---|
| 3,131,277 | 4/1964 | Brenzen | 200/157 |
| 3,417,470 | 12/1968 | Damon | 30/276 |
| 3,711,946 | 1/1973 | Troutman | 30/388 |

Primary Examiner—Donald G. Kelly
Assistant Examiner—J. C. Peters
Attorney, Agent, or Firm—Wood, Herron & Evans

[57] ABSTRACT

A dual handle structure for use with an electrically powered, hand-held saw. A safety handle incorporates a safety switch and is disposed in a plane transverse to the plane of the saw's blade, and a main handle incorporates an off/on switch and is disposed in the plane of the saw's blade. The safety handle comprises a handgrip of generally arcuate configuration that defines an arc of at least about 90°, and a trigger member that extends along the handgrip's length and is pivotally connected at one end thereto, the handgrip and trigger member forming a curved bar-like handle. A switch carried in the handgrip electrically connects the trigger with the saw's power source. The safety handle structure is fixed to the saw such that same may be gripped by an operator from the side of the saw, from the top of the saw, or from any point therebetween, the trigger being operable by the operator from any of those hand positions since it extends the full length of the handgrip.

3 Claims, 4 Drawing Figures

HAND-HELD POWER SAW

This invention relates to hand-held power saws and, more particularly, this invention relates to a novel handle structure for a hand-held power saw.

The use of power saws in the meat processing industry has become quite commonplace over the years in an effort to upgrade the economic efficiency of that industry. One basic class of meat cutting saw is that which makes use of a circular saw blade, the circular saw blade being rotated at a relatively high rpm to cut bone and/or meat in processing of the meat from carcass form to commercial meat cuts. Use of a high speed circular saw to perform beef and pork carcass processing operations allows the number of carcasses processed per man hour to be greatly increased over manual sawing methods. Further, a high speed circular saw blade eliminates ragged bone edges and/or bone splinters that might otherwise arise if manual sawing methods were used.

One particular type of meat cutting saw which is hand held and guided is known as a splitter saw in the meat processing industry. A splitter saw is mainly used for the 'splitting' of beef and pork carcasses, i.e., the cutting in half of each whole carcass into two side sections preparatory to subsequent processing. Thereafter, each side of meat is further cut up by other types of saws into primal cuts (or, at least into smaller sections that can be more easily processed into primal cuts) which are then marketed to retain sales outlets for customer distribution. This splitting of a beef or pork carcass may be accomplished while the carcass is passing an operator's station on a moving conveyor, or may be accomplished while it is lying stationary on a table in front of an operator. The splitting of a carcass may also be accomplished while the carcass is hanging from a hook on an overhead rail.

A splitter saw is mainly characterized by the structural combination of a circular saw blade, an electric motor for rotating the blade that is positioned beyond the blade's periphery, and two handles for holding and guiding the saw during use. One handle is positioned on each side of the motor to provide an optimum weight balance for the saw, one handle being gripped by an operator's right hand and the other handle being gripped by the operator's left hand during use. That handle furthest from the saw blade's periphery is of the pistol grip type and includes a trigger switch for the saw's drive motor associated therewith. The other handle is generally of a T-bar type configuration, and does not incorporate any type of switch. This structural combination is of a relatively light weight (particularly when the saw is suspended from a counterbalance mechanism) such that, when in use, it can be manipulated or guided into substantially any spatial orientation desired by an operator.

To perform a splitting operation on either a beef or pork carcass it is apparent that the periphery or cutting edge of the circular saw blade must at all times be exposed during the cutting operation. In light of this, the circular blade splitter saw may provide potential safety hazards to the operator, and especially to a new or unskilled operator. This may be especially the case if the saw's T-bar shaped handle is released by the operator during or immediately after the cutting step while the operator holds onto the pistol grip shaped handle and continues to depress the off/on trigger switch. Such would keep the saw blade running at high speed, and would occur when the operator attempts to reorient or reposition the carcass so as to make the cutting operation a little easier for himself. However with only one hand holding the saw, and even if the splitter saw is hung from an overhead counterbalance mechanism, the saw may tend to swing or otherwise move so as to bring the circular blade into contact with the operator or an adjacent operator. Of course, because of the relatively high rpm at which the circular blade operates, contact of an operator's arm or hand with the cutting edge of the splitter saw would be dangerous and, obviously, may provide a severe cut or worse.

Therefore, it has been an objective of this invention to provide a novel dual handle structure for a hand-held power saw of the circular saw blade type (e.g., a splitter saw commonly used in the meat processing industry) where each handle incorporates an off/on switch for the saw's motor, the saw's motor being deactivated even if only one handle is released by an operator.

In accomplishing the objectives of this invention there is provided a safety handle that incorporates a safety switch and is disposed in a plane transverse to the plane of the saw's blade, and a main handle that incorporates an off/on switch and is disposed in the plane of the saw's blade. The safety handle comprises a handgrip of generally arcuate configuration that defines an arc of at least about 90°, and a trigger member that extends along the handgrip's length and is pivotally connected at one end thereto, the handgrip and trigger member forming a curved bar-like handle. A switch carried in the handgrip electrically connects the trigger with the saw's power source. The safety handle structure is fixed to the saw such that same may be gripped by an operator from the side of the saw, from the top of the saw, or from any point therebetween, the trigger being operable by the operator from any of those hand positions since it extends the full length of the handgrip.

Other objectives and advantages of this invention will be more apparent from the following detailed description taken in conjunction with the drawing in which.

Figure 1:
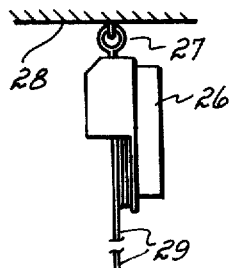
FIG. 1 is a perspective view illustrating the dual handle structure on a hand-held power saw.

As is shown in FIG. 1, the hand-held power saw is basically of the splitter saw type commonly used in the meat processing industry. The power saw 10 includes a circular blade 11 driven by a motor 12, the motor being drivingly interconnected with the saw blade by a drive shaft (not shown). The drive shaft interconnects with center spindle 13 onto which the saw blade 11 is fixed. A safety guard 15 overlies the rearward segment or half of the saw blade 11, the safety guard and blade 11 structure being structurally connected to the motor 12 by drive shaft housing 14 which is mounted at one end to the guard and at the other end to the motor.

The drive motor 12 is an electric motor, a plug outlet 15' being mounted at the top thereof by means of which an extension cord (not shown) may electrically connect the motor with a power source. A pistol grip type handle 16 is provided at the rear of the saw 10 and is fixed to the rear face 17 of the electric motor 12 by screws 18. The pistol grip handle 16 is substantially planar in configuration, and is disposed in the same plane as the saw blade 11 itself. The pistol grip handle 16 incorporates a trigger 19 pivotally mounted thereto as at 20. The trigger 19 cooperates with a switch (partially shown as at 21) to function as an on/off switch for the electric motor.

A splash guard 22 is fixed to the front face of the electric motor 12 and depends downwardly therefrom. The splash guard 22 cooperates with a bone dust and fat shield 23 fixed as by screws 24 to the rear face 17 of the motor. The hog splitter saw is also provided with a hanger 25 fixed to the top of the motor adjacent the center of gravity of the saw when same is horizontally disposed as shown in FIG. 1. A spring balancer mechanism 26 of any known type may be hung, as at 27, from the ceiling structure 28 of the building in which the saw is located. The free end of the spring balancer line 29 is interconnected by grip 30 with the hanger 25 fixed to the electric motor 12. The spring balancer mechanism 26 functions to carry part of the weight of the saw as same is being used by an operator, yet permits the saw to be moved into whatever spatial attitude is required by the operator so as to successfully split the hog carcass.

Figure 4:
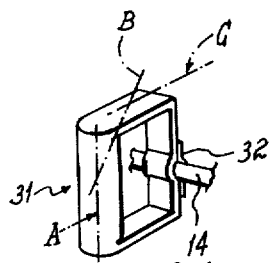
FIG. 4 is a perspective view showing a secondary handle for the saw as known to the prior art.

The splitter saw structure 10 described in detail to this point in the specification is known to the prior art. Further, and also according to the prior art, and as is illustrated in FIG. 4, the prior art hog splitter type saw 10 makes use of a secondary handle 31 fixed to the drive shaft housing 14. This secondary handle 31 is permanently fixed in a single position, i.e., either in position A (shown in solid lines), or in position B or position C (as shown in phantom lines). The position so selected for the secondary handle 31 is dependent on the desire of the saw's operator, i.e., some operators desire to have the secondary handle positioned as shown in position A, some desire to have it positioned as shown in position B, and some desire to have it positioned as shown in position C; the position so selected is dependent primarily on the whim of the operator. This secondary handle 31 is necessary because the saw becomes heavy to an operator over prolonged periods of use, i.e., because the saw is easier to hold in position over prolonged periods with the operator's right hand grasping the rear handle 16 and the operator's left hand grasping the secondary handle 31. Further, this dual handle aspect of the prior art hog splitter saw permitted easier guiding of the hog splitter saw during use by the operator.

However, the prior art secondary handle 31 requires an adjustable mount 32 provided therewith to accommodate periodic translation of the handle from position A to position B to position C depending on the operator that uses the saw. This adjustable mount 32 allows the handle 31 to be oriented into position A, position B, or position C as desired by the operator when the saw was used by a different operator, thereby causing down time for the equipment. Further, release of the secondary handle 31 by an operator, while retaining a handgrip on the rear handle 16 (including depression of the trigger 19), might cause the saw to swing in an undesirable manner toward the operator holding same or toward an adjacent operator, thereby causing a safety hazard.

Figure 3:
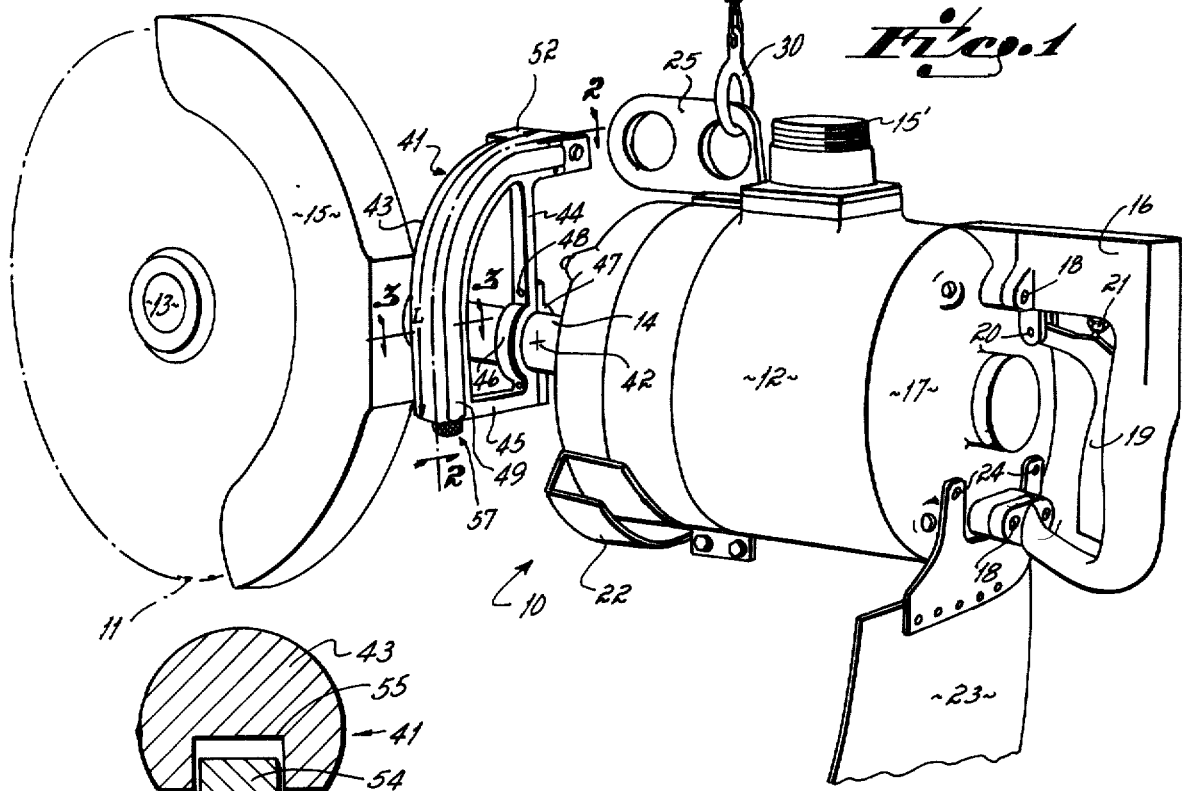
FIG. 3 is a cross-sectional view taken along line 3—3 of FIG. 1.
Figure 2:
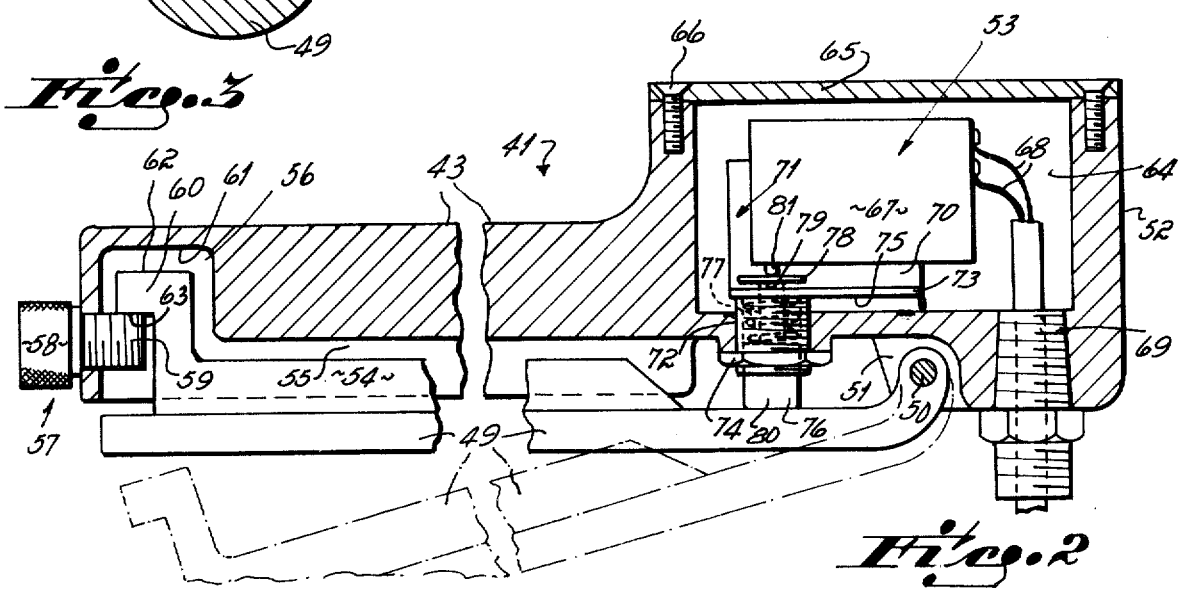
FIG. 2 is a cross-sectional view taken along line 2—2 of FIG. 1.

This invention contemplates, in combination with the piston grip handle 16, a safety handle 41 as illustrated in FIGS. 1-3. The safety handle 41 is of a generally round barlike configuration, and is generally arcuate in configuration relative to the center point 42 of its mounted location on the saw's drive shaft housing 14. The secondary handle is, as is particularly shown in FIG. 1, disposed in a plane transverse to the saw blade 11, and therefore, transverse to the rear handle 16.

The safety handle 41 includes a handgrip section 43 the ends of which are interconnected by web members 44, 45. Web 44 of the handgrip 43 is provided with a curved section 46 adapted to conform with the outer periphery of the drive shaft housing 14 and adapted to mate with a seat member 47. The curved section 46 and seat 47 are bolted together as at 48 to mount the safety handle 41 to mount the drive shaft housing at a single location. Because the safety handle 41 is arcuate in configuration, and extends from the 12 o'clock position to the 9 o'clock position as viewed in FIG. 1, same obviates the need for shifting of the handle from one position to another (compare with positions A, B and C as shown in FIG. 4) depending on the particular desire or whim of the operator using the saw.

A trigger member 49 constitutes a part of the front handle 41, and extends substantially throughout the arcuate length L of the handgrip 43. The trigger member 49 is fixed to the handgrip 43 on that side thereof opposite to the saw blade 11, and is pivotally mounted on a pin 50 disposed in a vertical plane that is parallel to the plane of the pistol grip handle 16 and to the plane of the saw blade 11. This pivotal connection is provided at the 12 o'clock position on the safety handle 41, the pin 50 being carried between ears 51 formed in the casting which constitutes the housing 52 for the safety switch mechanism 53.

Note that trigger member 49 is provided with a rib 54 along that side thereof adjacent the handgrip 43. The rib 54 is adapted to be received in groove 55 defined in the handgrip 43 with a slight clearance therebetween when the trigger 49 is pinned to the handgrip in the common operational attitude as shown in FIG. 2, thereby providing a structural relationship which prevents the trigger 49 from becoming deformed out of arcuate symmetry with the handgrip 43 over periods of prolonged use. Note also that the handgrip 43, at that end opposite the pivot pin 50 connection with the trigger 49, carries an adjustable thumb screw 57 which passes into cavity 56 at the end of groove 55. The thumb screw 57 is provided with an exposed knurled head 58 which permits the screw portion 59 to be threaded into or out of the cavity 56. The thumb screw's threaded stem 59 is adapted to cooperate with a foot 60 carried by the trigger member, the foot extending beyond rib 54 on the same side of the trigger 49 and into the cavity 56. The thumb screw 57 is normally in that attitude illustrated in solid lines in FIG. 2 so that the pivot motion of the trigger member 49 is limited between the floor 61 of the cavity 56 and the sole 62 of the foot 60. Contact of foot 60 with the cavity's floor 61 provides a positive stop to prevent injury to the safety switch mechanism 53 when the safety handle 41 is gripped by an operator. Further, contact of the foot's top surface 63 with the thumb screw 57 maintains the trigger 49 and handgrip 43 in operational assembly when the handle 41 is not gripped by an operator. However, and because of the fact that the saw is used in an operating environment that requires great care in the maintenance of cleanliness, the groove 55 and cavity 56 provided in the handgrip 43 may be cleaned of foreign matter that tends to catch therein simply by releasing the thumb screw 57 and pivoting the trigger member 49 outwardly into the phantom line position illustrated in FIG. 2.

As mentioned, the handgrip 43, adjacent the 12 o'-clock location thereof, incorporates a housing 52 that defines an enclosure 64 adapted to be closed by plate 65 fixed to the casting by screws 66. A spring biased open switch 67 is located within the housing 52, the switch being connected by electric leads 68 through fitting 69 to appropriate circuitry, not shown, of the saw itself. The switch 67 is fixed to the floor 70 of a mounting plate 71 by screws, not shown, and a hollow threaded sleeve 72 is fixed to the flange 73 of the mounting plate. The mounting plate 71 is fixed in place within enclosure 64 by nut 74, the flange 73 abutting against roof 75 of the enclosure. A plunger 76 is received in the sleeve 72, the plunger being spring 77 loaded (the spring 77 is interposed between the underside of the plunger 76 and flange 73). Foot 78 is fixed to one end of shaft 79 (the plunger's head 80 being fixed to the other end), the foot 78 being adapted to rest upon switch point 81 of the switch 67. The plunger 76 is thus spring loaded against the safety handle's trigger member 49, thereby continually spring loading the front handle into that attitude illustrated in solid lines in FIG. 2 (which position does not affect the switch 67 and, since that switch 67 is spring biased open, renders the saw 10 inoperative).

In operation, and when the saw is being used by an operator, the operator may grasp the safety handle 41 at either the 12 o'clock, 9 o'clock or 10:30 o'clock positions thereon without having to adjust that safety handle relative to the drive shaft housing 14 because of the generally arcuate overall configuration of the handle. Further, and because the switch 53 carried by that front handle is electrically connected through leads 68 with the electric motor 12 and the switch (not shown) carried by the rear handle 16, the trigger member 49 of the safety handle and the trigger member 19 of the rear handle must be both activated to achieve operation of the saw. That is, the switch 53 of the safety handle 41 and the switch (not shown) of the rear handle 16 are electrically connected in series relative to the power source so that both switches must be activated before the saw blade 11 will operate. This, of course, provides a safety factor in that the saw 10 must be gripped by an operator with both hands before same will function as desired.

Having set forth the preferred embodiment of my invention, what I desire to claim and protect by Letters Patent is:

1. A hand-held power saw comprising
a saw blade,
a motor drivingly connected with said saw blade, said motor being located beyond the periphery of said saw blade,
a main handle fixed to said motor at the end thereof opposite said saw blade, said main handle incorporating an off/on switch for said motor adapted to be activated by a trigger member, said main handle being located in the plane of said saw blade, and
a dual grip safety handle connected to said saw and interposed between said motor and said saw blade, said safety handle lying in a plane substantially transverse to the plane of said saw blade, said dual grip safety handle including
a first handgrip section of generally arcuate configuration that defines an arc of at least about 90°, said first section being fixed to said saw,
a second handgrip section that extends along said first section's length from one end thereof to the other, said second section being movably connected to said first section, thereby permitting said second section to be squeezed toward first section regardless of where said safety handle is held along its length,
spring means interposed between said first and second handgrip sections, said spring means continuously biasing said second section away from said first section,
restraint means interconnecting said first and second handgrip sections, said restraint means defining the outer limit permitted of said second section from said first section as biased by said spring means, and
a safety switch fixed to said first section and adapted to be activated by said second section, said switch being electrically connected with said off/on switch such that said trigger member must be activated and said second handgrip section must be squeezed toward said first handgrip section to energize said motor.

2. A saw as set forth in claim 1 wherein said restraint means includes
structure defining a cavity within said first section,
a foot fixed to said second section and disposed within said cavity, and
a thumb screw adapted to be manually extended into and retracted from said cavity, said thumb screw restraining said second section in operational relation with said first section when extended into said cavity and permitting said second section to be moved away from said first section when retracted from said cavity to permit cleaning of said safety handle.

3. A saw as set forth in claim 1 including
structure defining a groove in said first section on that side opposite to said saw blade, and
structure defining a rib fixed to said second section, said rib being received within said groove during operational use thereof, thereby maintaining said second section in generally arcuate alignment with said first section.

* * * * *